(12) United States Patent
Haratani et al.

(10) Patent No.: US 6,278,602 B1
(45) Date of Patent: Aug. 21, 2001

(54) CERAMIC ELECTRONIC PART

(75) Inventors: Tatsuo Haratani; Yasunobu Yoneda, both of Takefu; Kyoshin Asakura, Sabae, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/361,763

(22) Filed: Jul. 27, 1999

(30) Foreign Application Priority Data

Jul. 27, 1998 (JP) .................................................. 10-211235

(51) Int. Cl.$^7$ .............................. H01G 4/005; H01G 4/12
(52) U.S. Cl. ................... 361/303; 361/306.3; 361/321.2
(58) Field of Search .................. 361/303, 306.1, 361/306.3, 321.1–321.5, 322, 329, 330

(56) References Cited

U.S. PATENT DOCUMENTS 3,539,886 * 11/1970 Kellerman ............................ 361/303
4,584,074 * 4/1986 Sterling et al. .................... 204/181.1

FOREIGN PATENT DOCUMENTS

| 2123035 | 1/1984 | (GB) . |
| 8-58259 | 3/1996 | (JP) . |

OTHER PUBLICATIONS

Patent Abstracts of Japan, vol. 1997, No. 11, Nov. 28, 1997 & JP 09 190947 A (Murata Mfg Co Ltd), Jul. 22, 1997.

* cited by examiner

*Primary Examiner*—Anthony Dinkins
(74) *Attorney, Agent, or Firm*—Ostrolenk, Faber, Gerb & Soffen, LLP

(57) ABSTRACT

A ceramic electronic part includes a plurality of internal electrodes arranged in a ceramic sintered compact, superimposed via a ceramic layer. The free ends of the internal electrodes are formed to have a wedge-like cross-sectional shape, with the length L of the wedge and the internal thickness t of the electrode at the base of the wedge satisfying the relationship L>2t so that there is no risk of generating inter-layer peel-off or delamination in the ceramic layers.

9 Claims, 5 Drawing Sheets

CERAMIC ELECTRONIC PART

BACKGROUND OF THE INVENTION

1. Field of the Invention

The present invention relates to a ceramic electronic part, such as a laminated capacitor, and a method for producing the same. More specifically, it relates to a ceramic electronic part with an improved shape for the lateral edges of its internal electrodes and a method for producing the same.

2. Description of the Related Art

FIG. 6 is a cross-sectional view showing an embodiment of a conventional laminated capacitor. The laminated capacitor 51 has a ceramic sintered compact 52 comprising dielectric ceramics. A plurality of internal electrodes 53a to 53d are formed in the ceramic sintered compact 52 such that they are superimposed in the thickness direction via respective ceramic layers. The internal electrodes 53a, 53c extend to the end face 52a, and the internal electrodes 53b, 53d extend to the end face 52b. External electrodes 54, 55 cover the end faces 52a, 52b, respectively.

The ceramic sintered compact 52 to be used in the above-mentioned laminated capacitor 51 is produced by the process described below. A plurality of ceramic green sheets having internal electrodes 53a to 53d printed thereon are laminated together with an optional number of unprinted ceramic green sheets located on the upper and lower surfaces of the compact so as to obtain a laminated product. A conductive paste is used to form the internal electrodes. After the laminated product has been pressed in the thickness direction, it is baked.

Because the internal electrodes 53a to 53d are formed by baking the printed conductive paste, they have a substantially homogeneous thickness. The tip (one lateral edge) of the internal electrode 53a, that is, the part shown in the circle in FIG. 6, is shown in an enlarged view of FIG. 7A.

As apparent from FIG. 7A, the internal electrode 53a has a substantially homogeneous thickness to the tip. As shown in FIG. 7B, in some cases the tip of the internal electrode 53a may have a slight roundness.

However, due to the above-mentioned shape of the internal electrode, when the ceramic sintered compact 52 is formed, peel-off among the ceramic layers or the phenomenon called delamination sometimes occurs. This can be attributed to the fact that when the laminated product is pressed prior to baking, portions where the internal electrodes exist are compressed strongly in the thickness direction so as to have a higher density, whereas portions where the internal electrodes do not exist are insufficiently compressed. As a result, the density of the portions B, C and D shown in FIG. 7A before baking vary in the order B>D>C. This variation causes delamination or inter-layer peel-off in the sintered compact. In particular, in the case of an internal electrode with a thickness of 3 $\mu$m or more (used for high reliability), this phenomena has been remarkable.

A method for alleviating the reduction in density in the part shown as C in FIG. 7A is disclosed in Japanese Unexamined Patent Publication No. 8-58259. This publication proposes a method of printing a conductive paste, using a special screen printing plate, wherein the thickness of the internal electrode in the vicinity of its outer rim is thinner than at its other parts. The cross-sectional shape of an internal electrode formed according to this method is shown in FIG. 8. In the vicinity of the outer rim of the internal electrode 56 shown in FIG. 8, the internal electrode 56 is thinner at part 56b as a result of the presence of step 56a.

However, even in the sintered compact obtained by the method disclosed in the official gazette of Japanese Unexamined Patent Publication No. 8-58259, delamination and inter-layer peel-off is not satisfactorily prevented, and further improvement is desired.

SUMMARY OF THE INVENTION

An object of the present invention is to provide a ceramic electronic part such as a laminated capacitor, capable of effectively minimizing delamination and inter-layer peel-off phenomenon by improving the internal electrode shape, and a production method thereof.

A first aspect of the present invention is a ceramic electronic part comprising a ceramic sintered compact and a plurality of internal electrodes in the ceramic sintered compact, at least one lateral edge of at least one of the internal electrodes having a wedge-like cross-sectional shape, the length L of the wedge in the thickness t of the internal electrode at the base of the wedge satisfying the relationship L>2t.

Since the lateral edge of the internal electrode is formed to have a wedge-like cross-sectional shape, with the length L of the wedge and the thickness of the internal electrode at the base of the wedge satisfying the relationship L>2t, delamination or the inter-layer peel-off can be effectively restrained in the ceramic sintered compact. In particular, even in the case the thickness of the internal electrodes is increased to 3 $\mu$m or more, since the lateral edge has the above-mentioned wedge-like shape, generation of delamination can be effectively restrained. Therefore, a ceramic electronic part with an excellent reliability can be provided as the production yield can be improved.

In a second aspect of the present invention, the internal electrodes and the ceramic sintered compact are selected such that the contraction ratio of the ceramic material forming the sintered compact by baking is larger than the contraction ratio of the material forming the internal electrodes. Since the materials are selected such that the contraction ratio of the ceramics by baking is larger than the contraction ratio of the internal electrodes, the lateral edges of the internal electrodes can securely have the above-mentioned wedge-like cross-sectional shape after baking.

In a third aspect of the present invention, the lateral edges of the internal electrodes are formed to have a wedge-like cross-sectional shape, with the length L of the wedge and the thickness of the internal electrode t at the base part of the wedge satisfies L>2t. Since the lateral edges of the internal electrodes are formed to have a wedge-like cross-sectional shape, and to satisfy the relationship L>2t, delamination can securely be prevented also at the side face of the ceramic sintered compact.

In a fourth aspect of the present invention, the ceramic sintered compact is made from dielectric ceramics, and the plurality of the internal electrodes are laminated via a ceramic sintered compact layer in the thickness direction of the ceramic sintered compact so as to provide a laminated capacitor. Since the ceramic sintered compact is made from dielectric ceramics, and the plurality of the internal electrodes are laminated via a ceramic sintered compact layer, a laminated capacitor with an excellent reliability without the risk of generating delamination in the ceramic sintered compact according to the present invention can be provided with a high yield.

In a fifth aspect of the present invention, the thickness of the internal electrodes is in the range of 3 to 20 $\mu$m. With a thickness of 3 $\mu$m or greater, the internal electrodes themselves and the connection between the internal electrodes and the external electrodes can be more reliable, and the current capacity can be larger compared with the case of less than 3 µm. As to the upper limit of the internal electrode thickness, 20 µm or less is preferable as mentioned above in view of having a small size.

According to the fifth aspect of a ceramic electronic part of the present invention, since the thickness of the internal electrodes is 3 µm or greater, a laminated electronic part having a high reliability in the internal electrodes themselves and the connection between the internal electrodes and the external electrodes and a large current capacity can be obtained.

A sixth aspect of the present invention is a production method of a ceramic electronic part with a plurality of internal electrodes arranged in a ceramic sintered compact, comprising laminating a plurality of ceramic green sheets one on top of the other, at least some of the ceramic green sheets having conductive paste on a surface thereof such that the conductive paste is located between two adjacent ceramic green sheets, baking the laminated product to obtain the electronic part, the contraction ratio of the ceramic material forming the ceramic green sheets being greater than the contraction ratio of the conductive paste.

Since ceramics and a conductive paste with the contraction ratio of the ceramics by baking which is larger than the contraction ratio of the internal electrodes are used as the material of the ceramic green sheets and the conductive paste in obtaining a ceramic sintered compact after obtaining a laminated product by laminating a plurality of ceramic green sheets with a conductive paste for providing the internal electrodes printed and unprinted ceramic green sheets by baking the laminated product, a ceramic electronic part with the internal electrodes having a wedge-like cross-sectional shape according to the present invention can be provided easily and securely.

In particular, according to the production method of the fifth aspect, a ceramic electronic part according to the present invention can be provided in a process which is otherwise the same as the conventional production method by selecting the material for providing the internal electrodes and the conductive paste without the need of a jig such as a special screen printing plate, or the like. Therefore, a high reliable ceramic electronic part can be provided without the increase of the ceramic electronic part cost.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

DESCRIPTION OF THE PREFERRED EMBODIMENTS

Figure 1A:
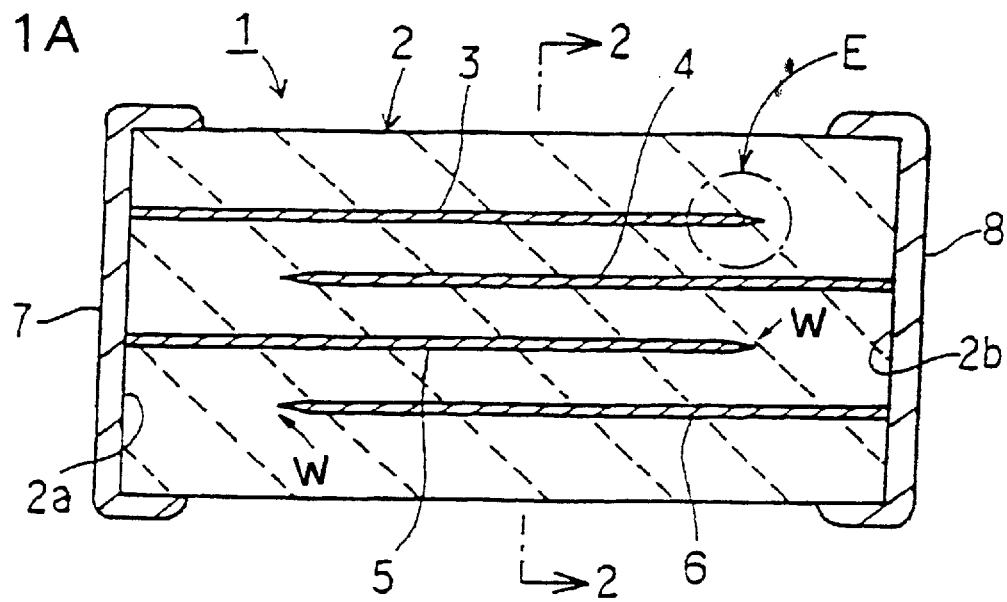
FIG. 1A is a side cross-sectional view of a laminated capacitor as a ceramic electronic part according to a first embodiment of the present invention.
Figure 1B:
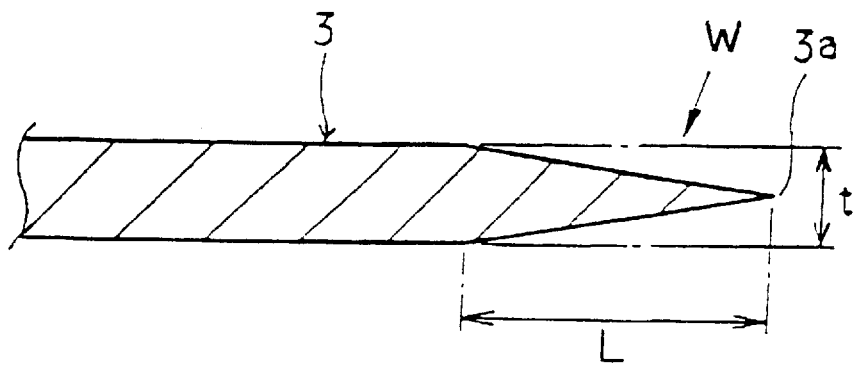
FIG. 1B is an enlarged partial cross-sectional view of the part shown by the circle E in FIG. 1A.
Figure 2:
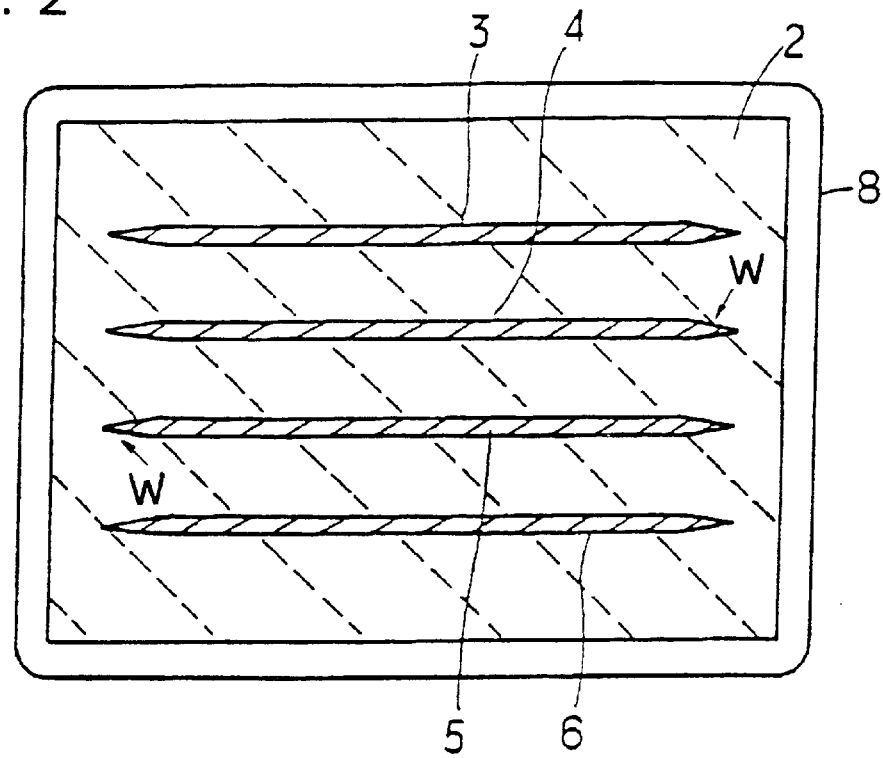
FIG. 2 is a cross-sectional view taken on the line 2—2 of FIG. 1.

FIG. 1A is a side cross-sectional view of a ceramic electronic part according to a first embodiment of the present invention, and FIG. 1B is an enlarged partially notched cross-sectional view of the part shown by the circle E in FIG. 1A. In this embodiment, the ceramic electronic part is a capacitor.

A laminated capacitor 1 has a ceramic sintered compact 2 comprising dielectric ceramics. A plurality of internal electrodes 3 to 6 are formed in the ceramic sintered compact 2 such that they are superimposed in the thickness direction via respective ceramic layers. The internal electrodes 3, 5 extend to the end face 2a of the ceramic sintered compact 2, and the internal electrodes 4, 6 extend to the end face 2b. External electrodes 7, 8 are formed so as to cover the end faces 2a, 2b, respectively, with the result that external electrode 7 is electrically coupled to internal electrodes 3 and 5 and external electrode 8 is electrically coupled to internal electrodes 4 and 6.

The outer lateral edges W (sometimes referred to herein as the "rims" or "free edges") of the internal electrodes 3 to 6, except the edges extending to the end faces 2a, 2b, have a wedge-like cross-sectional shape best shown in FIG. 1B. The shape of the edges W preferably satisfy the relationship L>2t, wherein L is the length of the wedge (FIG. 1B) and t is the thickness of the internal electrode at the base of the wedge. As shown in the experimental results discussed below, the incidence of delamination and inter-layer peel-off is effectively restrained when this ratio is met.

In order to realize a wedge-like cross-sectional shape satisfying the relationship L>2t, the materials used for the internal electrodes and the ceramic sintered compact may be selected such that the contraction ratio of the ceramics during baking is larger than the contraction ratio of the internal electrodes during baking. This will be explained with reference to FIGS. 3 and 4.

Figure 3:
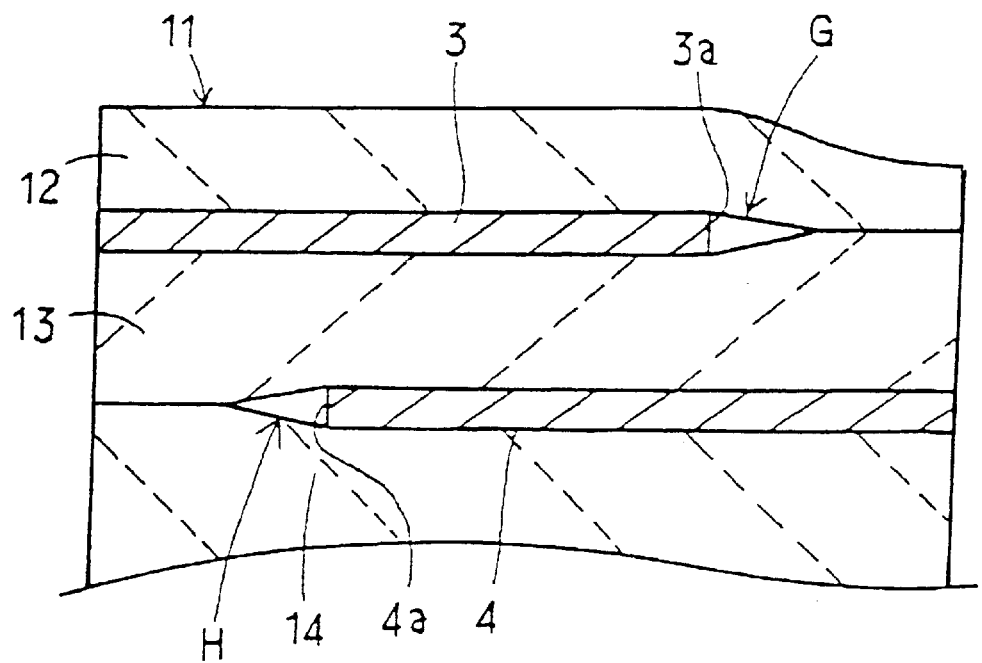
FIG. 3 is a schematic cross-sectional view for explaining the operation of a ceramic electronic part according to the present invention and a ceramic laminated product before baking.

FIG. 3 schematically illustrates the relationship between the internal electrodes and the ceramic green sheets in the ceramic laminated product before sintering. The laminated product 11 has ceramic green sheets 12 to 14 laminated together with the internal electrodes 3, 4 located between them. The internal electrodes 3, 4 are formed by printing a conductive paste on the upper surface of the ceramic green sheets 13, 14, respectively.

If the laminated product 11 is compressed in its thickness direction (vertically in FIG. 3), the laminated product can be sufficiently compressed in the areas where the internal electrodes 3, 4 are laminated. However, a sufficient compression is not applied in the areas indicated by arrows G and H in FIG. 3. Therefore, a portion of the ceramic material having a low density exists outside of the tips 3a, 4a of the internal electrodes 3, 4.

Figure 4:
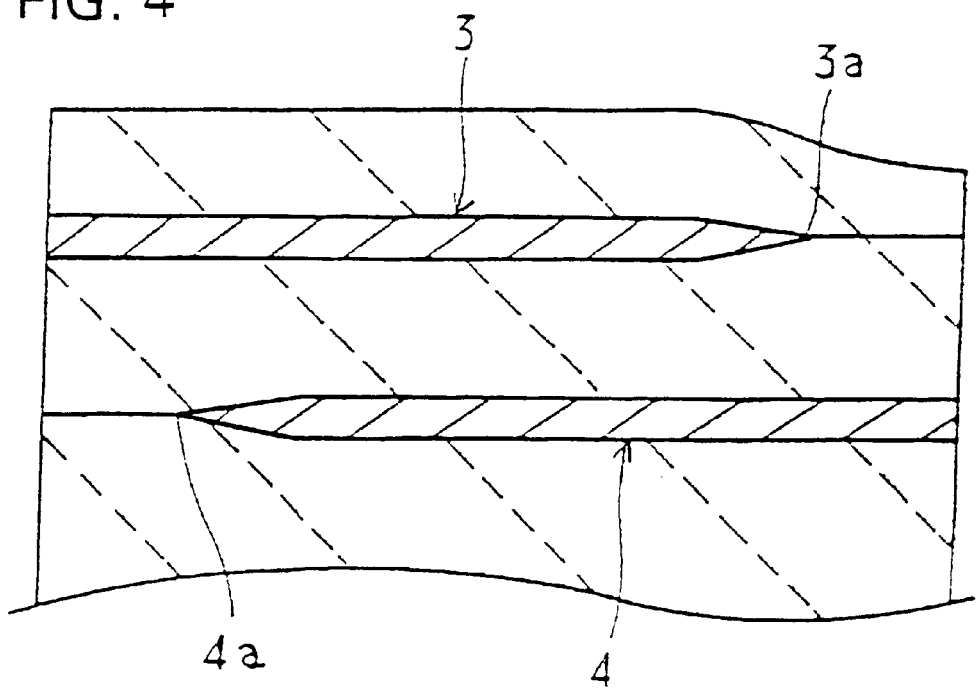
FIG. 4 is a schematic partial cross-sectional view for explaining the sintered compact obtained by baking the laminated product shown in FIG. 3.

However, when the laminated product 11 is baked, the contraction ratio of the ceramics is larger than the contraction ratio of the internal electrodes 3, 4. Therefore, the ceramics expand as shown in FIG. 4 to deform the tips 3a, 4a of the internal electrodes 3, 4 to have a wedge-like cross-sectional shape. As a result, the ceramics are sintered densely in the vicinity of the tips 3a, 4a of the internal electrodes 3, 4 so that the occurrence of inter-layer peel-off and delamination is reduced.

There are many ways to achieve the foregoing contraction ratios. By way of example, and not limitation, two other methods can be used: (1) using a conductive paste with a low ratio of a binder to be scattered after baking and a high ratio of metal powders for the internal electrodes, and (2) adding a high melting point such as Ni, Mo and W to a conductive paste which is used to form the internal electrodes.

One non-limiting example of the first method uses a low temperature sintering ceramics ($CaZrO_3$+glass material) and a conductive paste having about 2 to 5% by weight of an organic binder contained with respect to 100% by weight of metal powders. One non-limiting example of the second method adds a high melting point metal into the internal electrodes. For example, if low temperature sintering ceramic ($CaZrO_3$+glass material) is used as the ceramic material and a conductive paste mainly containing Cu with a 1083° C. melting point is used, about 0.5 to 10% by weight of at least one element selected from a group of elements having a comparatively high melting point with respect to Cu, such as Ni, Mo, W, or the like, can be added with respect to 100% by weight of Cu.

The composition of the internal electrodes as mentioned above is to be adjusted according to the contraction ratio of the ceramics to be used, and thus any appropriate composition can be used.

A production method of a ceramic electronic part according to the present invention, and the effects of the present invention, will be explained hereinafter with respect to concrete experimental examples.

EXPERIMENTAL EXAMPLES ACCORDING TO THE INVENTION

Experimental Example 1

In order to obtain a ceramic sintered compact 2, a rectangular ceramic green sheet was formed with a ceramic slurry mainly containing low temperature sintering ceramics ($CaZrO_3$+glass material) powders. In order to form the internal electrodes 3 to 6 on the ceramic green sheet, a conductive paste with a composition ratio of 100% by weight of Cu powders having a 1.0 μm average particle size and 3.0% by weight of an organic binder was screen printed onto the ceramic green sheets. Thereafter, a plurality of the ceramic green sheets on which the conductive paste was printed were laminated together, and unprinted ceramic green sheets were laminated above and below the foregoing group of sheets. The entire laminate was pressed in the thickness direction to obtain a laminated product. The laminated product was baked at 1000° C. so as to obtain a ceramic sintered compact 2 with a 1.6×0.8×0.8 mm size. The number of laminations of internal electrodes was 4.

By applying a conductive paste onto opposite end faces of the obtained ceramic sintered compact 2 and baking, external electrodes 7, 8 were formed so as to obtain a laminated capacitor 1. The formation of the external electrodes 7, 8 can be conducted in the same manner as baking of the laminated product.

The final thickness of the internal electrodes after baking in the laminated capacitor of this embodiment was 3 μm. That is, t=3 μm. From the observation of the lateral edges of the internal electrodes after cutting the obtained sintered compact, it was determined that the lateral edges had a wedge-like shape and L=10 μm.

Experimental Example 2

Figure 5:
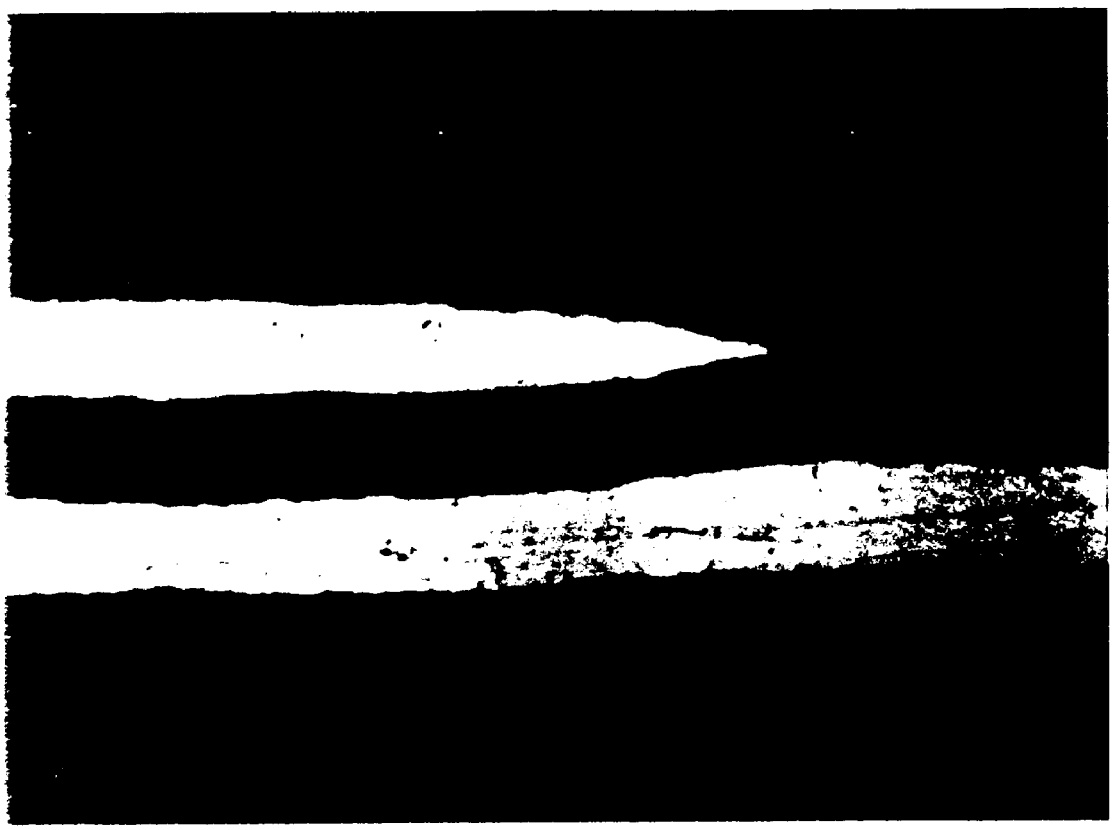
FIG. 5 is a microscope photograph for explaining the shape of the lateral edge of the internal electrode of the laminated capacitor obtained in a second embodiment of the invention.
Figure 6:
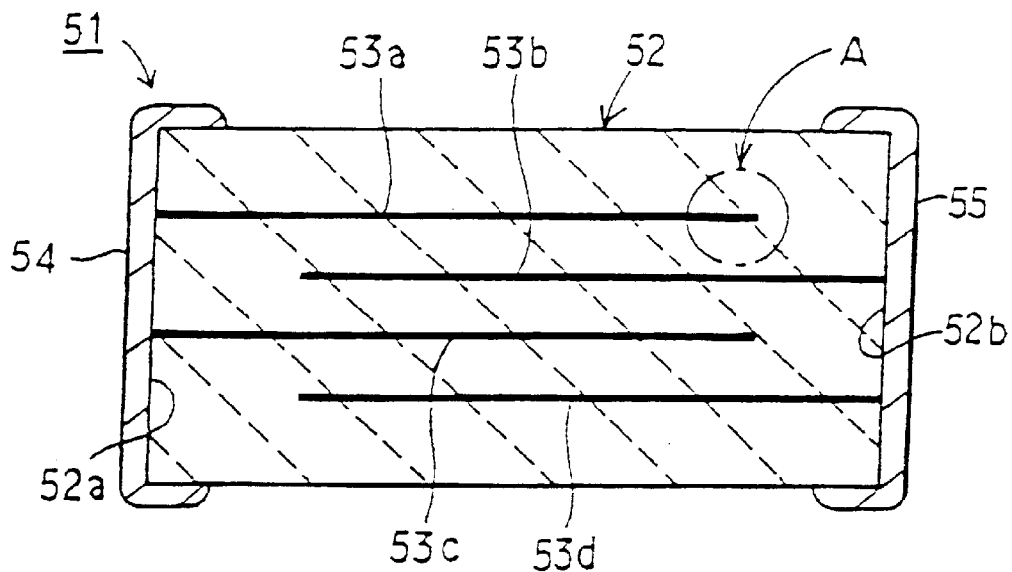
FIG. 6 is a cross-sectional view showing an example of a conventional laminated capacitor.
Figure 7A:
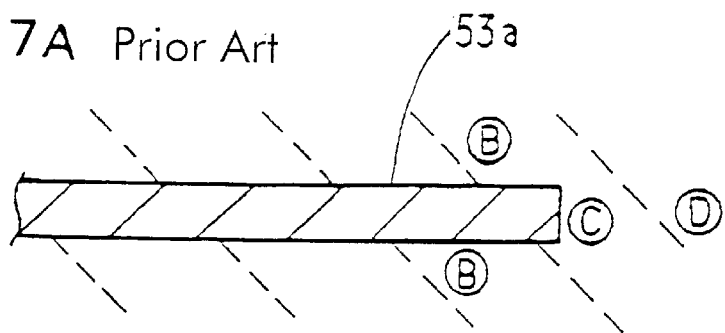
FIGS. 7A and 7B are partial enlarged cross-sectional views for explaining the shape of the lateral edge of the internal electrode in the conventional laminated capacitor.
Figure 7B:
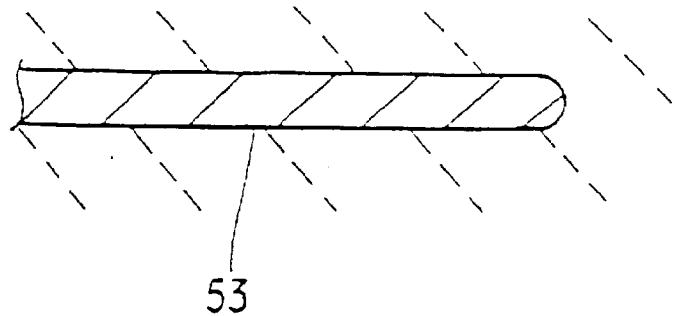

Using the same process described above, a second laminated capacitor with a 10 μm final thickness of the center part of the internal electrodes was produced. From the observation of the lateral edges of the internal electrode after cutting the obtained sintered compact, it was determined that the lateral edges of the internal electrodes had a wedge-like shape as shown in the microscope photograph of FIG. 5. In this case, the dimensions of the wedge-like shape were t=10 μm and L=25 μm.

Comparative Experimental Examples

Several comparative embodiments 1, 2, 3, 4 were prepared to compare the attributes of the present invention to other structures.

Comparative Example 1

A laminated capacitor was obtained in the same manner as in the Experimental Example 1 except that the internal electrodes with a composition ratio of 10% by weight of an organic binder with respect to 100% by weight of Cu powders having a 1.0 μm average particle size were used. In this case, the final internal electrode thickness was 3 μm, and from the observation of the lateral edges of the internal electrodes after cutting the obtained sintered compact, it was determined that the thickness of the internal electrodes was about 3 μm throughout, including at its outer lateral edges.

Comparative Example 2

A laminated capacitor was obtained in the same manner as in the Comparative Example 1 except that the thickness of the internal electrodes was 10 μm. The obtained sintered compact was cut to observe the lateral edges of the internal electrodes. It was determined that the thickness of the internal electrodes was substantially equal to 10 μm throughout, including at its outer lateral edges.

Comparative Example 3

Figure 8:
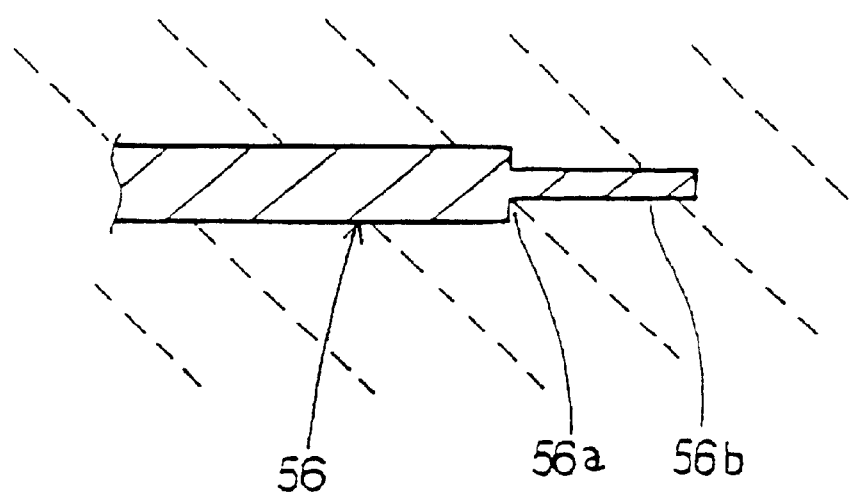
FIG. 8 is a partial enlarged cross-sectional view for explaining the shape of the lateral edge of the internal electrode of a conventional laminated capacitor.

A laminated capacitor was obtained in the same manner as in the Experimental Example 1 except that the internal electrodes were printed according to the process described in Japanese Unexamined Patent Publication No. 8-58259. The lateral edges of the internal electrode had the cross-sectional shape shown in FIG. 8.

Comparative Example 4

A laminated capacitor was obtained in the same manner as in the Comparative Example 3 except that the thickness of the internal electrodes was changed to be 10 μm. In this laminated capacitor, the cross-sectional shape of the lateral edges of the internal electrode was the same as the internal electrode 56 shown in FIG. 8.

Comparative Example 5

A laminated capacitor was produced in the same manner as in the Experimental Example 1 except that a conductive paste with a composition of 7.0% by weight of an organic binder with respect to 100% by weight of Cu powders having a 1.0 μm average particle size were used as the material comprising the internal electrodes. From the observation of the lateral edges of the internal electrodes after cutting the obtained sintered compact of the laminated capacitor, it was determined that t=3 μm, and L=3 μm. That is, L<2t.

Comparative Example 6

A laminated capacitor was produced in the same manner as in the Experimental Example 1 except that a conductive paste with a composition of 7.0% by weight of an organic binder with respect to 100% by weight of Cu powders having a 1.0 μm average particle size were used. From the observation of the lateral edges of the internal electrodes after cutting the obtained sintered compact, it was determined that it had a wedge-like shape. However, t=10 μm, and L=5 μm. That is, L<2t.

The delamination generation ratios of the sintered compact in the 10 pieces of the laminated capacitor of the Experimental Examples 1, 2 and the Comparative Examples 1 to 6 obtained as mentioned above are shown in Table 1.

TABLE 1

| Sample | Delamination Generation Ratio (in % of delamination occurrences) |
| --- | --- |
| Experimental Example 1 | 0% |
| Experimental Example 2 | 0% |
| Comparative Example 1 | 20% |
| Comparative Example 2 | 100% |
| Comparative Example 3 | 5% |
| Comparative Example 4 | 60% |
| Comparative Example 5 | 10% |
| Comparative Example 6 | 80% |

As apparent from Table 1, the delamination generation ratio is high in the Comparative Examples 1, 2 with the thickness of the internal electrode at the outer lateral edges being substantially the same as that at the center of the internal electrode. In particular, with a thick internal electrode thickness of 10 μm, delamination was generated in the largest percentage of sintered compacts.

Similarly, in the Comparative Examples 3, 4, although the delamination generation ratio is lower than that in the Comparative Examples 1, 2, delamination generation was not prevented. Furthermore, with an internal electrode thickness of 10 μm, delamination was generated with a considerable rate.

Moreover, in the Comparative Examples 5, 6, probably because L<2t, the delamination generation ratio was 10% and 80%, respectively.

On the other hand, in the Experimental Examples 1, 2, there were no observed occurrences of delamination generation regardless of the thickness of the internal electrodes.

Although explanation has been given in the above-mentioned embodiments, the present invention can be adopted similarly in various ceramic electronic parts such as a laminated inductor, a laminated varister, a laminated piezoelectric ceramic part, or the like with the same effect of effectively preventing delamination in a ceramic sintered compact.

The present invention may be embodied in other specific forms without departing from the spirit or essential attributes thereof and, accordingly, reference should be made to the appended claims, rather than to the foregoing specification, as indicating the scope of the invention.

What is claimed is:

1. A ceramic electronic part comprising:

a ceramic sintered compact; and a plurality of internal electrodes located in the ceramic sintered compact, at least one lateral edge of at least one of the internal electrodes having a wedge-like cross-sectional shape, the length L of the wedge and the thickness t of the internal electrode at the base of the wedge satisfying the relationship $L>2t$.

2. The ceramic electronic part according to claim 1, wherein at least one lateral edge of all of the internal electrodes have a wedge-like cross-sectional shape, the length of each of the wedges and the thickness t of the corresponding internal electrode at the base of the wedge satisfying the relationship $L>2t$.

3. The ceramic electronic part according to claim 1, wherein all of the free lateral edges of all of the internal electrodes have a wedge-like cross-sectional shape and the length of each of the wedges and the thickness t of the corresponding internal electrode at the base of the wedge satisfying the relationship $L>2t$.

4. The ceramic electronic part according to any one of claims 1, 2 or 3, wherein the internal electrodes each extend from a respective side edge of the ceramic sintered compact into the interior of the ceramic sintered compact.

5. The ceramic electronic part according to any one of claims 1, 2 or 3, wherein the materials of the internal electrodes and the ceramic sintered compact are selected such that the contraction ratio of the ceramics sintered compact during a baking process is larger than the contraction ratio of the internal electrodes during such baking process.

6. The ceramic electronic part according to any one of claims 1, 2 or 3, wherein the ceramic sintered compact is made from a plurality of ceramic layers each formed of dielectric ceramics, and the plurality of the internal electrodes are laminated between respective ceramic layers in the thickness direction of the ceramic sintered compact so as to provide a laminated capacitor.

7. The ceramic electronic part according to any of claims 1, 2 or 3, wherein the thickness of the internal electrodes is in the range of 3 to 20 μm.

8. The ceramic electronic part according to claim 5, wherein the thickness of the internal electrodes is in the range of 3 to 20 μm.

9. The ceramic electronic part according to claim 6, wherein the thickness of the internal electrodes is in the range of 3 to 20 μm.

* * * * *